United States Patent [19]

Maejima et al.

[11] Patent Number: 5,432,443
[45] Date of Patent: Jul. 11, 1995

[54] LINEAR POSITION DETECTOR INCLUDING A PHASE SHIFTER AND A SAMPLE-AND-HOLD CIRCUIT FOR SYNCHRONIZING A SAMPLE PULSE PERIOD WITH THE REFERENCE PERIOD OF THE EQUILIBRIUM MODULATED SIGNAL

[75] Inventors: Hideo Maejima, Kawasaki; Motokazu Kamiyama, Isehara, both of Japan

[73] Assignee: Sony Magnescale Inc., Tokyo, Japan

[21] Appl. No.: 79,569

[22] Filed: Jun. 22, 1993

[30] Foreign Application Priority Data

Jun. 23, 1992 [JP] Japan .................................. 4-164796
Oct. 26, 1992 [JP] Japan .................................. 4-287836

[51] Int. Cl.⁶ .......................... G01B 7/02; G01B 11/02
[52] U.S. Cl. .......................... 324/207.24; 324/207.21; 250/231.16
[58] Field of Search ...................... 324/207.24, 207.13, 324/207.21, 207.16, 233, 236, 207.25, 207.23, 175; 318/652, 653; 250/231.14, 231.16; 327/9

[56] References Cited

U.S. PATENT DOCUMENTS

| | | | |
|---|---|---|---|
| 4,676,645 | 6/1987 | Taniguchi et al. | 356/356 |
| 4,982,156 | 1/1991 | Lewis et al. | 324/207.18 |
| 5,001,363 | 3/1991 | Anami | 324/207.25 |
| 5,065,095 | 11/1991 | Suzuki | 324/207.25 |
| 5,221,896 | 6/1993 | Kobayashi et al. | 324/207.17 |
| 5,339,030 | 8/1994 | Hayashi | 324/207.23 |

FOREIGN PATENT DOCUMENTS 54-30060  3/1979  Japan .

*Primary Examiner*—Sandra L. O'Shea
*Assistant Examiner*—Roger Phillips
*Attorney, Agent, or Firm*—Foley & Lardner

[57] ABSTRACT

An apparatus for detecting a relative displacement between a scale and a head is disclosed in which an equilibrium modulated signal derived from at least one detecting head is processed and converted into a DC voltage signal, a level of the DC voltage signal indicating the relative displacement of the scale to the head. At least one sample-and-hold circuit (its sampling time is synchronized with a reference signal, i.e., an excitation signal supplied to the head) or peak/hold circuit and low-pass filter (smoother) is used to provide the DC voltage signal.

8 Claims, 10 Drawing Sheets

20A

22

∵ X=X₁

∵ X=X₂

LINEAR POSITION DETECTOR INCLUDING A PHASE SHIFTER AND A SAMPLE-AND-HOLD CIRCUIT FOR SYNCHRONIZING A SAMPLE PULSE PERIOD WITH THE REFERENCE PERIOD OF THE EQUILIBRIUM MODULATED SIGNAL

BACKGROUND OF THE INVENTION

1. Field of the Invention

The present invention relates to an apparatus for detecting a relative displacement between a scale and a detecting head.

2. Description of the Background Art

A Japanese Patent Application First Publication No. Showa 54-30060 (published on Mar. 6, 1979) exemplifies a previously proposed relative displacement detecting apparatus.

That is to say, the previously proposed relative displacement detecting apparatus includes a pair of detecting heads, a scale, and detecting head signal processing circuits using a two channel processing method; namely, a first channel detecting head signal processing circuit including a first of the pair of detecting heads and a second channel detecting head signal processing circuit including a second of the pair of detecting heads.

The previously proposed relative displacement detecting apparatus described above further includes: an oscillator which generates and outputs a signal having a reference frequency f; an excitation circuit which generates and outputs an excitation signal $\epsilon$ of a sinusoidal wave or pulse wave having the reference frequency in response to the signal from the oscillator; a pair of preamplifiers which amplify the corresponding one of the detection signals of the pair of detecting heads, the detection signal being an equilibrium modulated signal; a phase shifter which shifts the equilibrium modulated signal derived from a first one of the pair of preamplifiers by 90°; an adder which adds the equilibrium modulated signal derived from a second one of the pair of preamplifiers and the 90°-phase shifted equilibrium modulated signal derived from the phase shifter and outputs a phase modulated signal of the sinusoidal wave therefrom; and a band pass filter which eliminates unnecessary signal components from the phase modulated signal from the adder.

As described above, since the phase modulated signal output from the adder usually includes higher harmonic wave distortions, the band pass filter of a higher order is provided so as to provide a desired phase modulated signal from the output signal of the adder.

However, the band pass filter causes a source of time delay in the relative displacement detecting apparatus and disturbs a size of the apparatus from miniaturization and a low cost thereof.

SUMMARY OF THE INVENTION

It is, therefore, a principal object of the present invention to provide a small-sized and lower cost apparatus for detecting a relative displacement between a scale and a head which can avoid a time delay in a relative displacement detecting operation of the apparatus.

The above-described object can be achieved by providing an apparatus comprising: a) a scale; b) first means for generating and outputting an excitation signal of an alternating current having a reference period of time; c) at least one head which is so constructed as to generate an equilibrium modulated signal therefrom in response to a displacement of said scale with respect to said head, said equilibrium modulated signal indicating the relative displacement of said scale to the head, utilizing the excitation signal derived from said first means; and d) second means for receiving and converting said equilibrium modulated signal derived from said head to provide a continuous DC voltage signal, a level of said DC voltage signal indicating the relative displacement of the scale to said head.

The above-described object can also be achieved by providing an apparatus comprising: a) a scale; b) first means for generating and outputting an excitation signal of an alternating current having a reference period of time; c) a plurality of channel circuits having a plurality of detecting heads, each of which is so aligned as to have a mutual distance from an adjacent head denoted by $(m+\frac{1}{4})\lambda$, wherein $\lambda$ denotes a recording wavelength of the scale, and so arranged as to generate an equilibrium modulated signal therefrom in response to a displacement of said scale with respect to said head, said equilibrium modulated signal indicating the relative displacement of said scale to the head, utilizing the excitation signal derived from said first means; and d) second means, included in each channel circuit, for receiving and converting said equilibrium modulated signal derived from each of said head to provide a continuous DC voltage signal, a level of said DC voltage signal indicating the relative displacement of the scale to the heads.

DESCRIPTION OF THE PREFERRED EMBODIMENTS

Reference will, hereinafter, be made to the drawings in order to facilitate a better understanding of the present invention.

(First Preferred Embodiment)

Figure 1A:
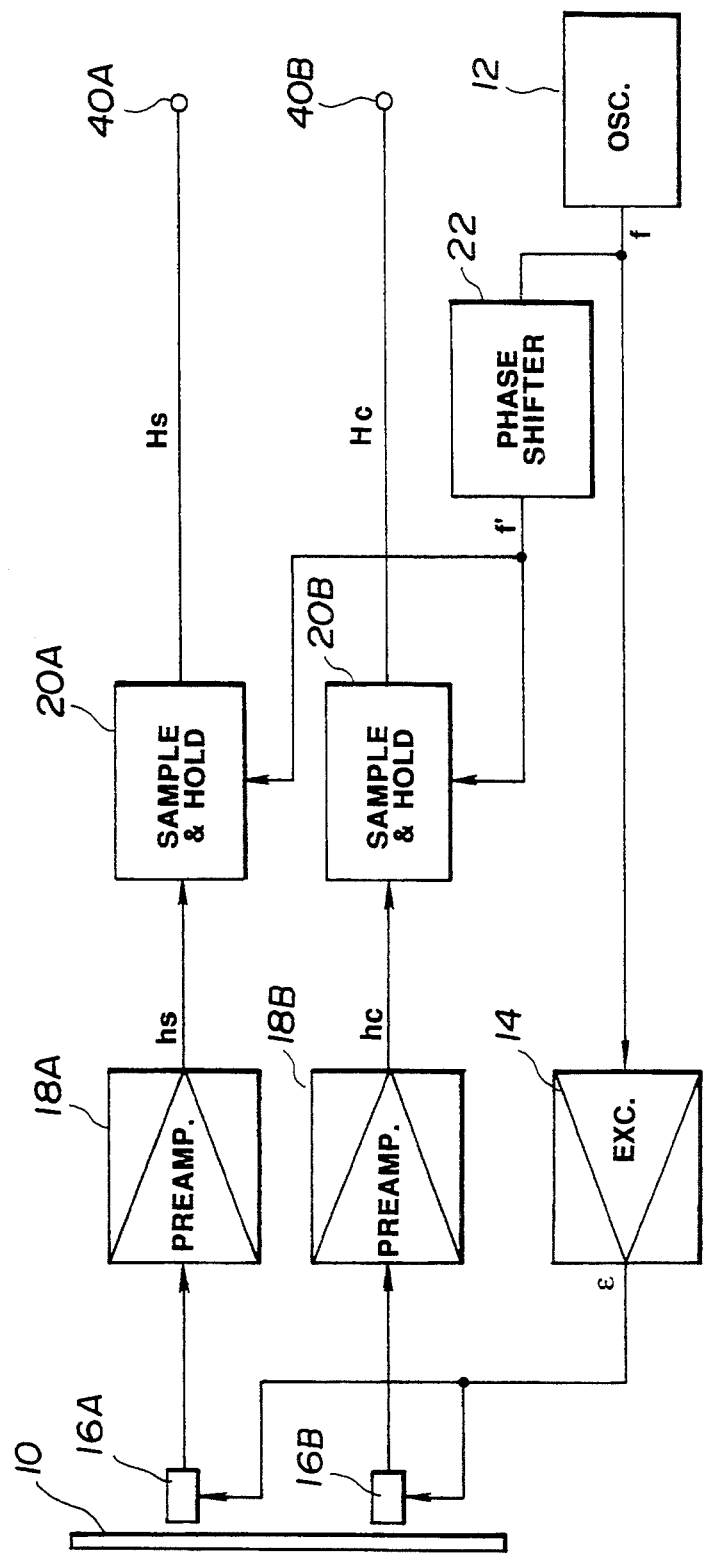
FIG. 1(A) is a circuit block diagram of a relative displacement detecting apparatus in a first preferred embodiment according to the present invention.

FIG. 1(A) shows a first preferred embodiment of a relative displacement detecting apparatus according to the present invention.

As shown in FIG. 1(A), a pair of detecting heads 16A, 16B and associated two channels of processing circuits are provided.

A magnetic scale 10 is usually attached onto a part of a machine which precisely requires a displacement of the part of the machine.

The pair of detecting heads 16A, 16B are located adjacent to the magnetic scale to detect precisely the displacement, e.g., a longitudinal movement of the scale 10 with respect to the position of each head 16A, 16B.

In the first embodiment, the magnetic scale 10 comprises rod-shaped multi-pole (N pole and S pole) magnetic material on which the N pole and S pole are alternatingly provided aside of each magnetic pole so as to face with the same pole and having a scale wavelength $\lambda$.

It is noted that either magnetic type head circuits comprising the magnetic scale and two magnetic heads, magnetic recording type head circuits comprising a magnetic encoder scale and two heads made of magnetoresistance elements, or optical type head circuits comprising an optical scale and two optical heads may be used for the detecting circuits having the scale 10 and the pair of detecting heads 16A, 16B as will be described later.

In the first embodiment, the magnetic scale 10 of a magnetic flux responsive type (the two N-N same poles and S-S poles are aligned with each other) and the two heads 16A, 16B, a distance of each gap of the heads being denoted by, e.g., $(m+\frac{1}{4})\lambda$ (m denotes an integer, i.e., $\pi/2$ (90-degree electrical phase difference) and each head with a saturation core, are provided.

Referring back to FIG. 1(A), a pair of preamplifiers 18A, 18B, associated sample-and-hold circuits 20A, 20B, a phase shifter 22, an oscillator 12 and an excitation circuit 14 are provided for the respective channels.

Supposing that a reference frequency of a reference signal output from the oscillator 12 is denoted by f ($=\omega_c/2\pi$), an excitation current output from the excitation circuit 14 is denoted by $\epsilon$ ($=i\cdot\sin(\omega_c t/2)$), an equilibrium modulated signal hs output from a first detecting head 16A and amplified by means of the associated preamplifier 18A is expressed as follows:

$$hs = a_1\sin(\omega_c t + \phi_1) + a_2\sin(2\omega_c t + \phi_2)\sin\theta + \quad (1)$$
$$a_3\sin(3\omega_c t + \phi_3) + a_4\sin(4\omega_c t + \phi_4)\sin\theta + \ldots +$$
$$a_{2n-1}\sin\{(2n-1)\omega_c t + \phi_{2n-1}\} + a_{2n}\sin(2n\omega_c t + \phi_{2n})\sin\theta + \ldots$$

In the equation (1), $\theta = 2\pi x/\lambda$, x denotes a relative displacement of the detecting head 16A or 16B with respect to the scale 10, $\omega_c$, $a_n$, and $\phi_n$ denote constants.

Since a term including the displacement x from among the terms located at the right side of the equation (1) and to be derived finally is a term of $\sin\theta$, the right side is rearranged, with a certain time $t=T$, as follows:

$$hs = b_1 + b_2\sin\theta + b_3 + b_4\sin\theta + \ldots + b_{2n-1} + b_{2n}\sin\theta + \ldots \quad (2)$$
$$= \sum_{n=1}^{\infty} b_{2n-1} + \sum_{n=1}^{\infty} b_{2n}\sin\theta,$$

wherein $b_{2n-1}$ and $b_{2n}$ denote constants.

In the same way, the equilibrium modulated signal hc output from a second detecting head 16B and amplified by means of a second preamplifier 18B is expressed as follows:

$$hc = \sum_{n=1}^{\infty} C_{2n-1} + \sum_{n=1}^{\infty} C_{2n}\cos\theta, \quad (3)$$

wherein $C_{2n-1}$ and $C_{2n}$ denote constants.

The phase shifter 22 outputs a pulse train signal using the reference signal derived from the oscillator 12, the pulse train signal having a pulsewidth and phase adjusted so as to be suitable for the use as a sampling pulse.

Hence, the pulse train signal derived from the phase shifter 22 is provided with the frequency f' synchronized with the frequencies of the equilibrium modulated signals hs and hc output from the detecting heads 16A and 16B.

$$f' = f/n \quad (4),$$

wherein n denotes a natural number.

Figure 1B:
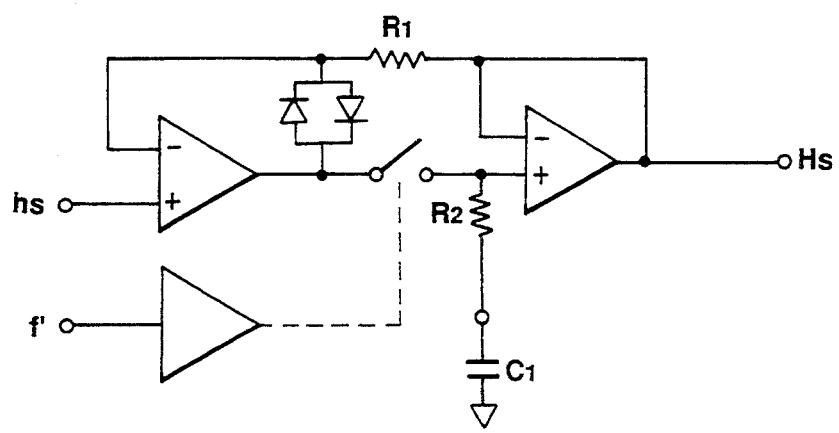
FIGS. 1(B) and 1(C) are internal circuit block diagram of a sample-and-hold circuit and a phase shifter used in the relative displacement detecting apparatus shown in FIG. 1(A).

FIG. 1(B) shows an example of each sample-and-hold circuit 20A, 20B shown in FIG. 1(A).

Each sample-and-hold circuit 20A, 20B uses the pulse train signal having the frequency f' derived from the phase shifter 22 as the sampling pulse so as to sample each equilibrium modulated signal hs and hc.

Figure 1C:
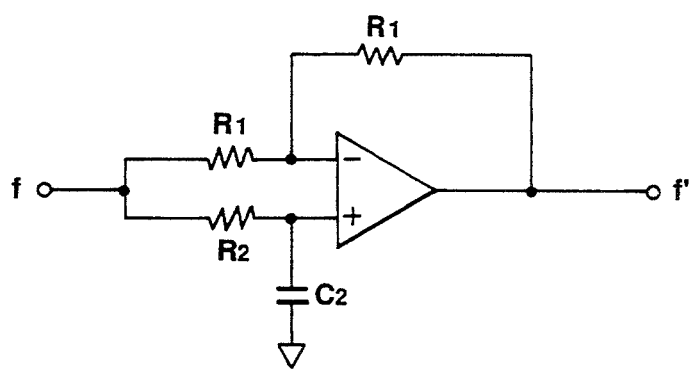

FIG. 1(C) shows an example of the phase shifter 22. In the case of the phase shifter 22 shown in FIG. 1(C), the reference signal from the oscillator is a sinusoidal wave and the output signal thereof is also a sinusoidal wave having the reference frequency f'.

Figure 2:
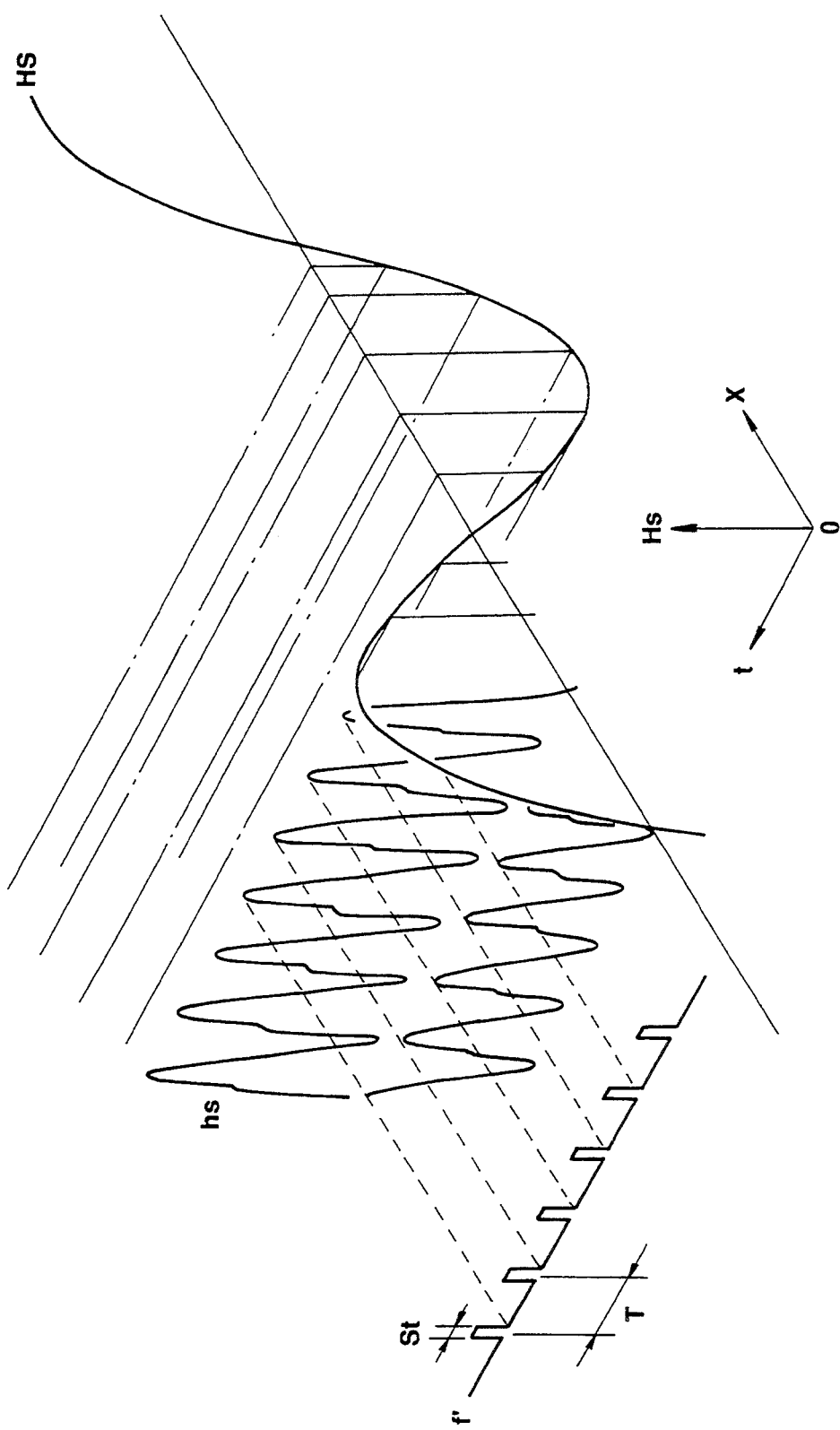
FIG. 2 is an integrated explanatory view of an equilibrium modulated signal hs derived from one of detecting heads shown in FIG. 1(A), a sampling pulse signal f' derived from the phase shifter, and a sampled-and-hold signal derived from the sample-and-hold circuit shown in FIG. 1(A), respectively.

FIG. 2 shows relationships among respective waveforms of equilibrium modulated signals hs and hc output from the detecting heads 16A, 16B (shown only in the case of the one equilibrium modulated signal hs), output signals Hs, Hc (shown only in the case of output level Hs) of the sample-and-hold circuits 20A, 20B, and sampling pulse f' output from the phase shifter 22 in terms of three dimensional space of three axes mutually perpendicular to time axis t, displacement axis x, and output level axis Hs, Hc (shown only for the output level axis Hs).

A pulse period of time T of the sampling pulse f' is synchronized with the period of each corresponding one of the equilibrium modulated signals hs and hc. A pulsewidth St represents a sampling time at each period T.

It is noted that the output levels of the signals Hs and Hc indicate peak values of the equilibrium is modulated signals hs and hc, respectively, and are sinusoidal waveforms with the displacement x being a variable as represented by the equation (5).

$$Hs(x) = D_1 + D_2\sin(2\pi x/\lambda) \quad (5)$$

$$(Hc(x) = E_1 E_2\cos(2\pi x/\lambda),$$

wherein $D_1$, $D_2$, $E_1$, and $E_2$ denote constants.

FIGS. 3(A) through 3(F) show respective waveforms of the equilibrium modulated signal hs and sampling pulse f' with the displacement of x being constant.

It is noted that the waveforms shown in FIGS. 3(A) through 3(F) appear on a plane vertical to the displacement axis x of FIG. 2.

Figure 3A:
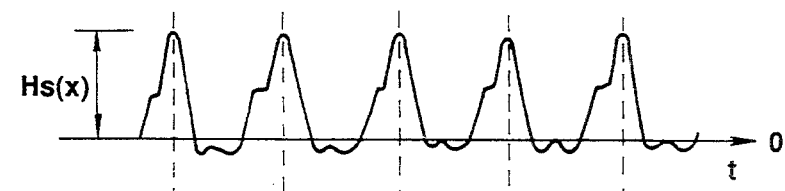
FIGS. 3(A) through 3(F) are signal waveform timing charts for explaining the waveform relationship with time of each essential part of the relative displacement detecting apparatus shown in FIG. 1(A).
Figure 3B:
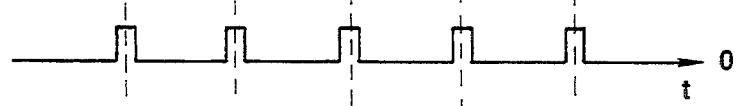
Figure 3C:
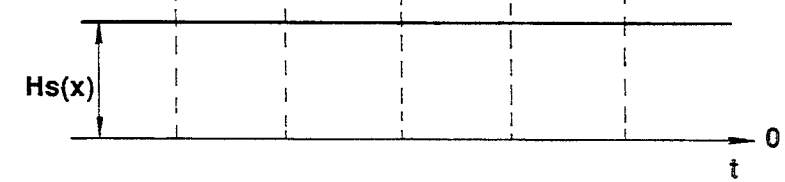
Figure 3D:
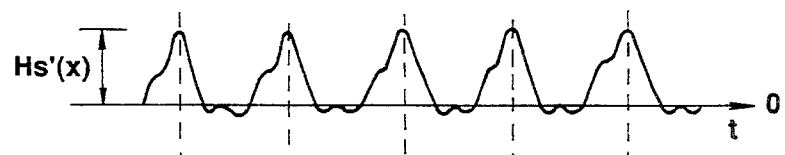
Figure 3E:

As shown in FIGS. 3(B) and 3(E), the period of sampling pulse is synchronized with the period of the equilibrium modulated signal hs.

For example, when $n=1$ in the equation (4), $f'=f/2$ and the sampling frequency f' of the sampling pulse is $\frac{1}{2}$ the frequency f of the equilibrium modulated signal hs. At this time, the equilibrium modulated signal hs is sampled for each waveform, i.e., for two waveforms by means of the sampling pulse. Furthermore, when $n=3$ in the equation (4), $f'=f/3$ and the frequency f' of the sampling pulse is $\frac{1}{3}$ the frequency f of the equilibrium modulated signal hs. At this time, the equilibrium modulated signal hs is sampled for each of two waveforms, i.e., for the three waveforms.

In either case, parts of the waveform of the equilibrium modulated signal hs having the same phases can always be sampled by sampling the equilibrium modulated signal hs using the sampling pulse f'.

As described above, the output level Hs output from the sample-and-hold circuit 20A becomes constant and in the form of a DC voltage signal.

It is noted that although it is possible to sample in terms of an arbitrary phase from among the waveforms of the equilibrium modulated signal hs, the output level Hs of the DC voltage is preferably large in order to obtain a high measurement accuracy.

Preferably, as shown in FIGS. 3(A) through 3(F), the sampling is carried out according to a peak position of the waveforms of the equilibrium modulated signal hs so as to provide a maximum output level Hs of the derived DC voltage.

The output level Hs of the DC voltage is also a function of the displacement x, as shown in the equation (4).

FIGS. 3(A) through 3(C) are operation results in the case of the DC voltage of the output level Hs when sampled from the equilibrium modulated signal hs and displacement of x is $x_1$.

Figure 3F:
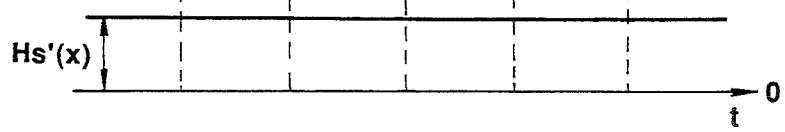

FIGS. 3(D) through 3(F) are operational results in the case of tile DC voltage of the output level Hs when sampled from the equilibrium modulated signal hs the displacement $x=x_2$ ($x_2 \neq x_1$).

In the way described above, output level Hs of the DC voltage signal is derived and the displacement x is derived from the equation (4).

(Second Preferred Embodiment)

Figure 4:
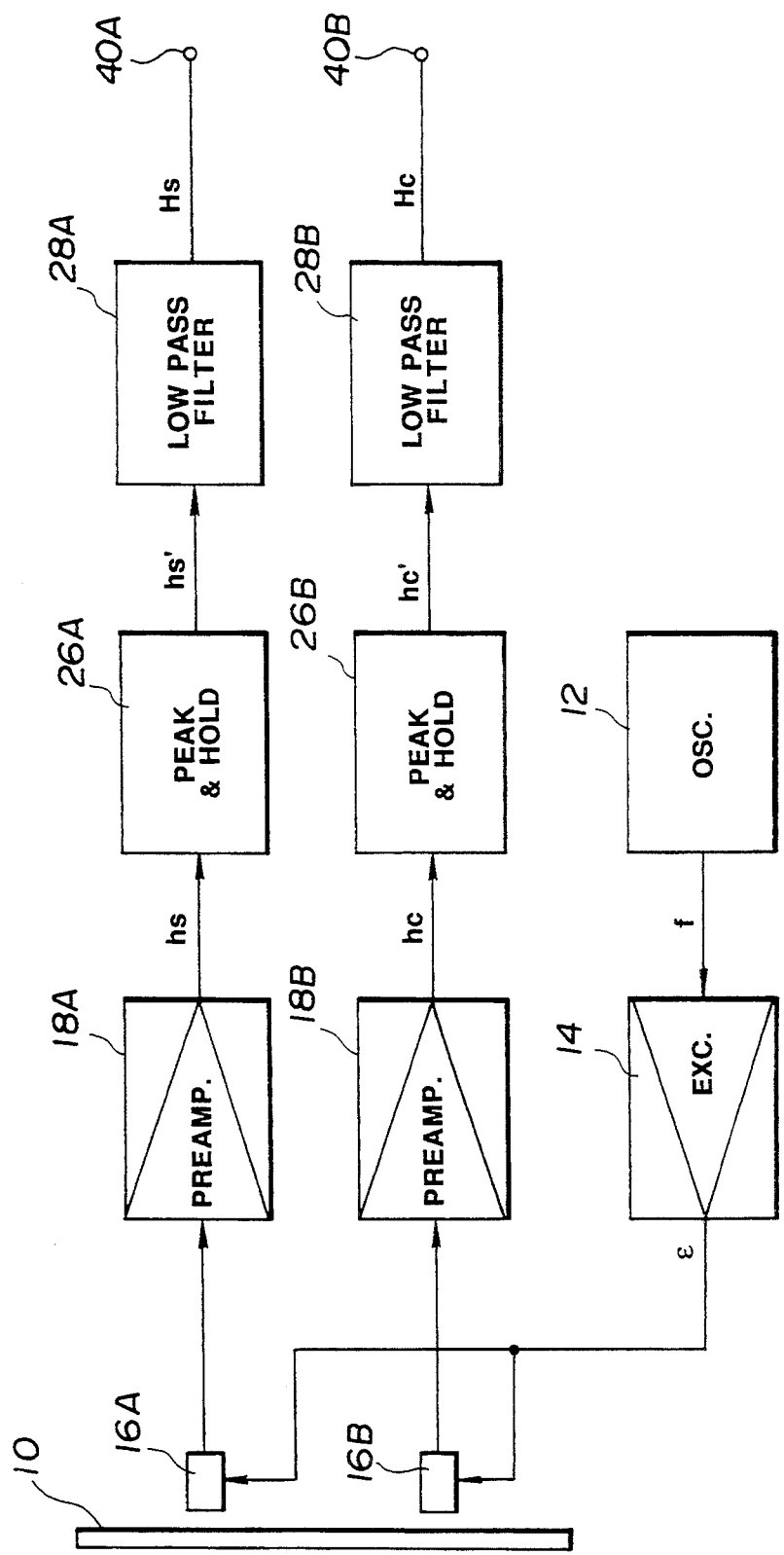
FIG. 4 is a circuit block diagram of a relative displacement detecting apparatus in a second preferred embodiment according to the present invention.

FIG. 4 shows a second preferred embodiment of the relative displacement detecting apparatus according to the present invention.

As shown in FIG. 4, two peak/hold circuits 26A and 26B and low-pass filters 28A and 28B are provided for the respective channels in place of the sample-and-hold circuits 20A and 20B and phase shifter 22 shown in FIG. 1(A).

Figure 5A:
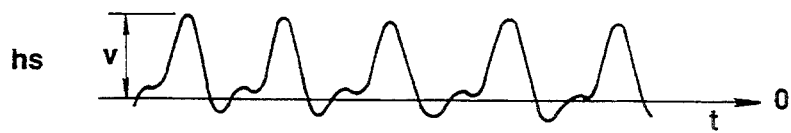
FIGS. 5(A) through 5(C) are explanatory views of signals hs, hs', and Hs in the relative displacement detecting apparatus shown in FIG. 4 and a low-pass filter, respectively.
Figure 5B:
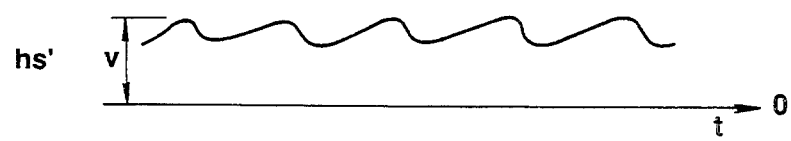
Figure 5C:
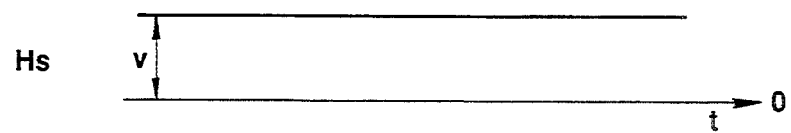

FIGS. 5(A) through 5(C) show respective waveforms of one channel portion of the relative displacement detecting apparatus shown in FIG. 4.

FIG. 5(A) shows a waveform of the equilibrium modulated signal hs output from the detecting head 16A.

FIG. 5(B) shows a waveform of a peak/hold signal output from the peak/hold circuit 26A.

FIG. 5(C) shows an output waveform smoothed by means of the low-pass filter 28A.

The output from the low-pass filter 28A is substantially DC voltage as shown in FIG. 5(C) so that the relative displacement x is derived from the equation (5) using the level of the DC voltage Hs.

Figure 6:
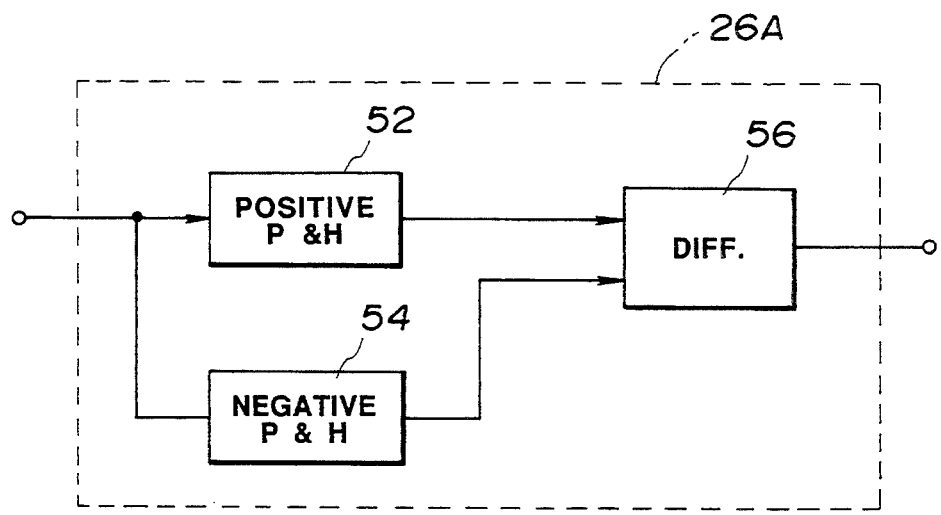
FIG. 6 is an example of a peak/hold circuit shown in FIG. 4.

FIG. 6 shows an example of the peak/hold circuit 26A shown in FIG. 4.

The peak/hold circuit 26A includes a positive peak/hold (plus maximum value holding) circuit 52, a peak/hold (minus maximum value holding) circuit 54, and a differential amplifier 56 having an operational (OP) amplifier.

(Third and Fourth Preferred Embodiments)

Figure 7:
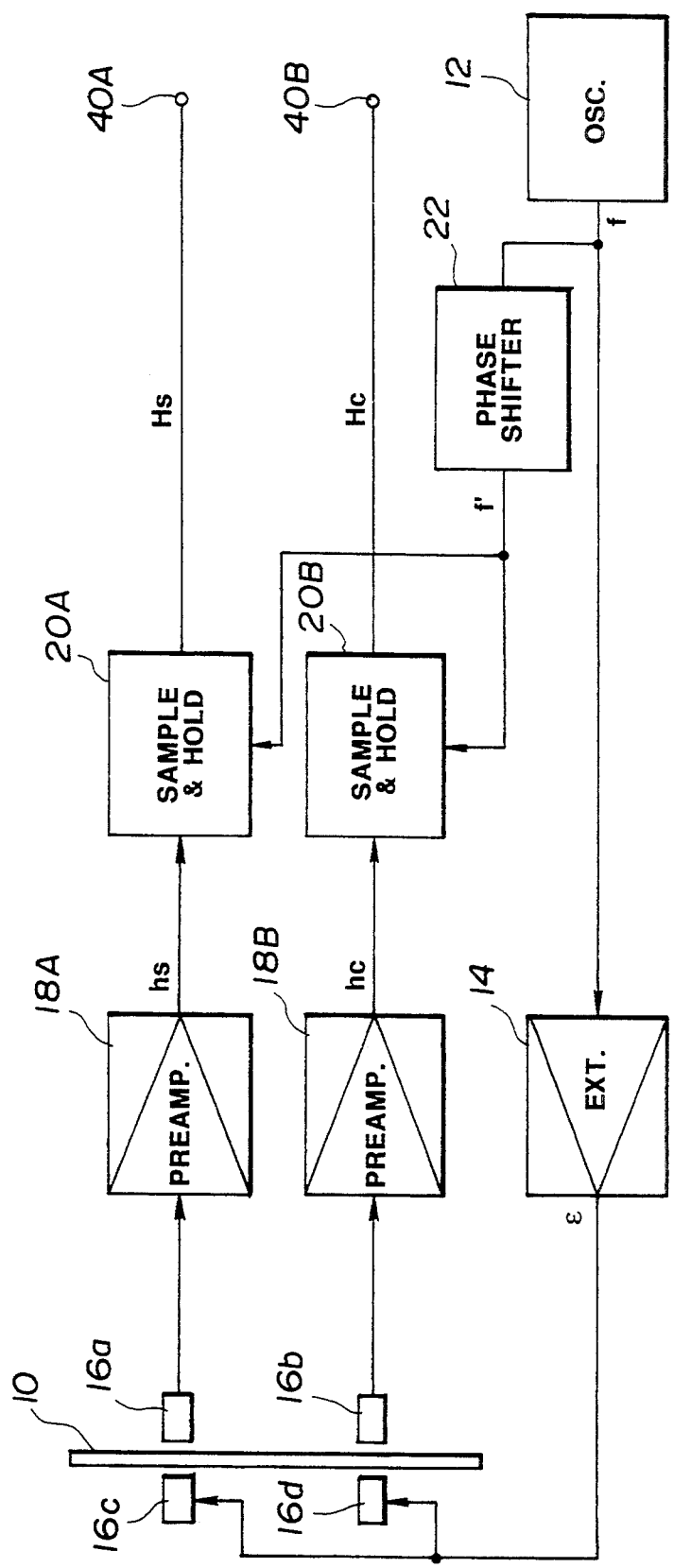
FIG. 7 is a circuit block diagram of a relative displacement detecting apparatus in a third preferred embodiment according to the present invention.
Figure 8:
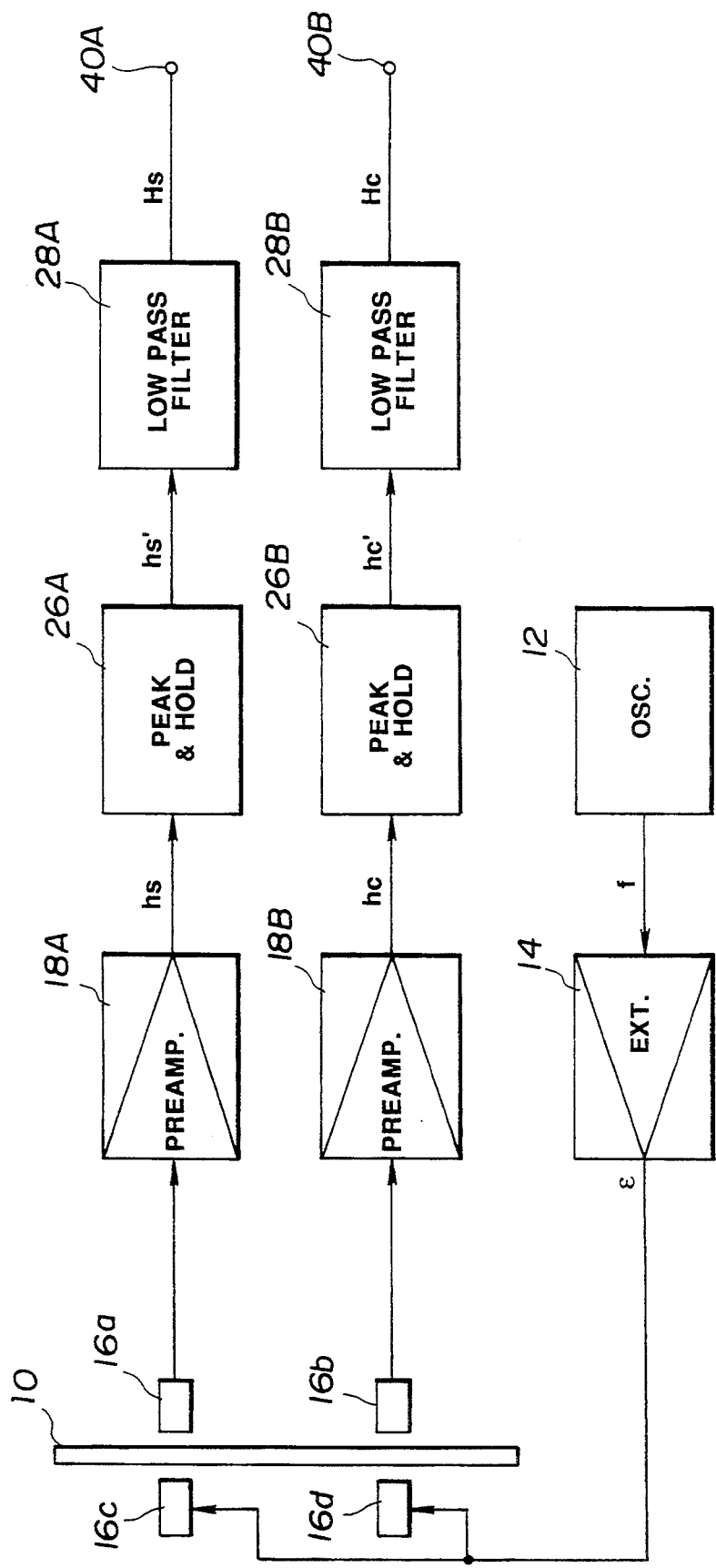
FIG. 8 is a circuit block diagram of a relative displacement detecting apparatus in a fourth preferred embodiment according to the present invention.

FIGS. 7 and 8 show third and fourth preferred embodiments of the relative displacement detecting apparatus according to the present invention.

In the third and fourth preferred embodiments, the optical type scale 10 and the pair of detecting heads 16a, 16b, 16c, and 16d are used.

The third embodiment of FIG. 7 corresponds to the first embodiment shown in FIG. 1(A) and the fourth embodiment of FIG. 8 corresponds to the second embodiment shown in FIG. 4.

As shown in FIGS. 7 and 8, the scale 10 is constituted by the optical scale, the detecting heads 16a through 16d are constituted by a pair of light emitting devices 16c and 16d and a pair of light receiving devices 16a and 16b. The pair of light emitting devices 16c and 16d are located adjacent to the optical scale 10 so as to be sandwiched with respect to the opposing pair of light receiving devices 16a and 16b.

The first channel includes first light emitting device 16c and first light receiving device 16a. The second channel includes second light emitting device 16d and second light receiving device 16b.

As shown in FIGS. 7 and 8, each light emitting device 16c, 16d is arranged between both sides of the optical scale 10 and so as to oppose to each light receiving device 16a, 16b.

An excitation signal is derived from the excitation circuit 14 to the pair of light emitting devices 16c and 16d and the equilibrium modulated signals are supplied from the respective light receiving devices 16a and 16b to the preamplifiers 18A and 18B.

It is noted that another optical scale of a type of reflection may alternatively used for the optical scale 10. In the case of the reflection type, both light emitting devices and light receiving devices are arranged over either side of the reflection type optical scale 10.

It is also noted that the same operation is carried out for the second channel equilibrium modulated signal hc although the explanation on the first channel equilibrium modulated signal hs has been carried out.

In addition, although the two-channel type relative displacement of detecting apparatus and the detecting heads 16A, 16B with respect to the scale 10 have been explained so that the relative displacement of the heads to the scale can be detected, the relative displacement detecting apparatus may be formed of one channel type. It is of course that a multiple number of detecting heads exceeding three channel type may be installed. For example, each equilibrium modulated signal output from a corresponding detecting head has a mutually 30° phase difference.

(Fifth Preferred Embodiment)

Figure 9:
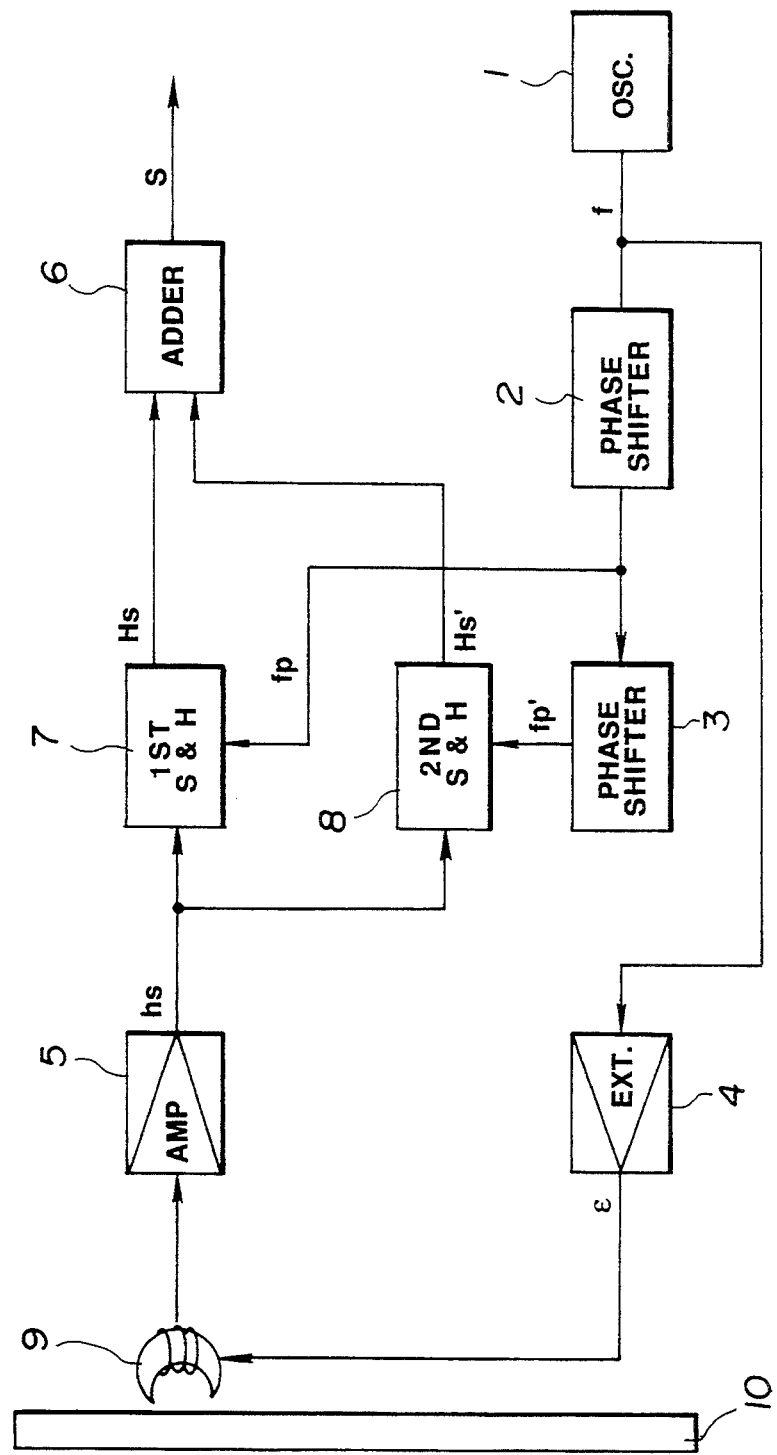
FIG. 9 is a circuit block diagram of a relative displacement detecting apparatus in a fourth preferred embodiment according to the present invention.
Figure 10:
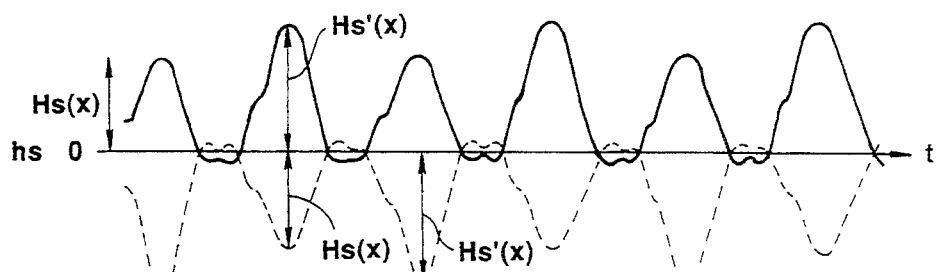
FIGS. 10(A) through 10(F) are signal waveform timing charts for explaining the operation of the relative displacement detecting apparatus shown in FIG. 9.
Figure 10:
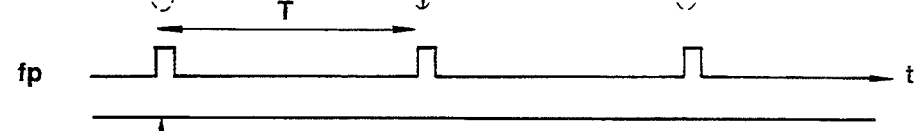
Figure 10:
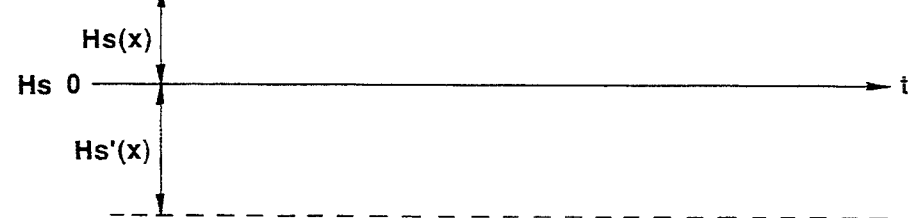
Figure 10:
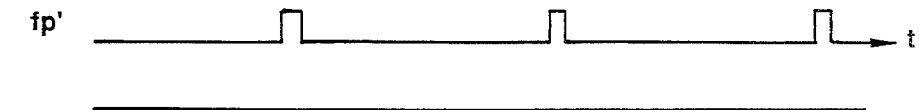
Figure 10:
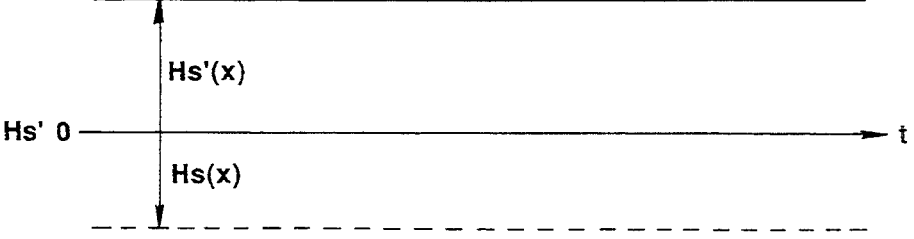
Figure 10:
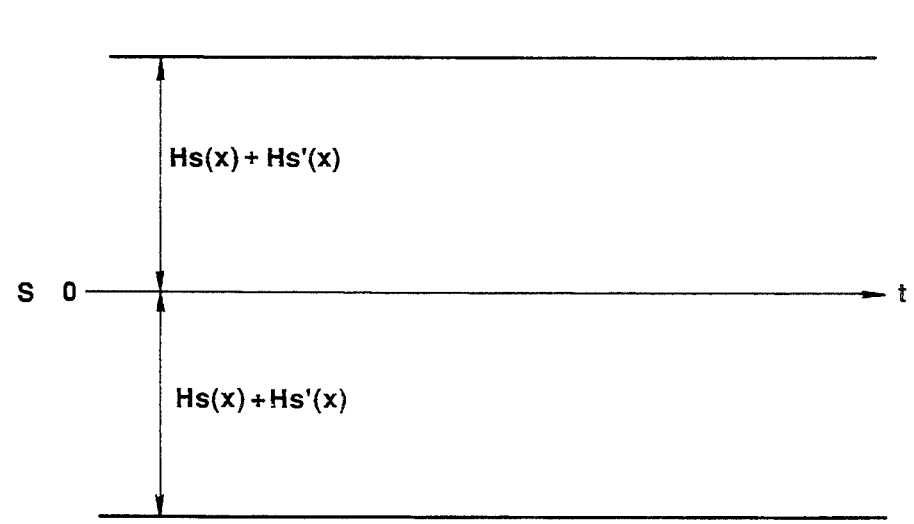

FIGS. 9 and 10 show a fifth preferred embodiment of a relative displacement detecting apparatus according to the present invention.

The relative displacement detecting apparatus shown in FIG. 9 includes the scale 10, a single detecting head 9, the oscillator 1, the excitation circuit 4, the amplifier 5, the first sample-and-hold circuit 7, the phase shifter 2, and the oscillator 1.

Furthermore, the relative displacement detecting apparatus shown in FIG. 9 includes another phase shifter 3, another (second) sample-and-hold circuit 8, and an adder 6.

The second phase shifter 3 serves to shift the phase of the sampling pulse $f_p$ by 180° and the second sample-and-hold circuit 8 serves to sample the equilibrium modulated signal hs using the sampling pulse $f'_p$ of the output signal of the phase shifter 3. The adder 6 serves to add the respective signals Hs and Hs' after the sampling by means of both sample-and-hold circuits 7 and 8.

Next, the operation of the relative displacement detecting apparatus in the fifth preferred embodiment shown in FIG. 9 will be explained below with reference to FIGS. 10(A) through 10(F).

Supposing that the reference frequency of the reference signal output from the oscillator 1 is denoted by f ($=\omega_c/2\pi$) and the excitation current output from the excitation circuit 4 is denoted by $\epsilon$ ($=i\cdot\sin \omega_c t$), the output signal hs from the detecting head 9 is given as in the same way as the equation (1).

The output signal hs is sampled at a predetermined time t. Suppose now that if $t=1/f$, $\omega_c t=2\pi f t=2\pi$.

In the same way, $2\omega_c t=4\pi$, $3\omega_c t=6\pi$, ....

Suppose now that these terms described above are substituted into the equation (1).

$$Hs = a_1\sin(2\pi + \phi_1) + a_2\sin(4\pi + \phi_2)\sin\theta + \\ a_3\sin(6\pi + \phi_3) + a_4\sin(8\pi + \phi_4)\sin\theta + \ldots + \\ a_{2n-1}\sin\{(4n-2)\pi + \phi_{2n-1}\} + a_{2n}\sin(4n\pi + \phi_{2n})\sin\theta \quad (6)$$

The equation (6) can be replaced with:

$$H_s = a_1\sin\phi_1 + a_2\sin\phi_2\sin\theta + a_3\sin\phi_3 + a_4\sin\phi_4\sin\theta + \ldots + \\ a_{2n-1}\sin\phi_{2n-1} + a_{2n}\sin\phi_{2n}\sin\theta + \ldots \quad (7)$$

On the other hand, if t is replaced with $T+T/2$ and $\omega_c t$ is replaced as:

$$\omega_c t = 2\pi f t = 2\pi \cdot 1/T \cdot (T+T/2) = 3\pi.$$

In the same way, suppose that $2\omega_c t=6\pi$, $3\omega_c t=9\pi$, $4\omega_c t=12\pi$, ....

Then, these terms are substituted into the equation (1). At this time, the following equation (8) is established.

$$Hs' = a_1\sin(3\pi + \phi_1) + a_2\sin(6\pi + \phi_2)\sin\theta + \\ a_3\sin(9\pi + \phi_3) + a_4\sin(12\pi + \phi_4)\sin\theta + \ldots + \\ a_{2n-1}\sin\{(6n-3)\pi + \phi_{2n-1}\} + a_{2n}\sin(6n\pi + \phi_{2n})\sin\theta + \ldots \quad (8)$$

The equation (8) can be replaced with:

$$Hs' = a_1\sin\phi_1 + a_2\sin\phi_2\sin\theta - a_3\sin\phi_3 + \\ a_4\sin\phi_4\sin\theta + \ldots - a_{2n-1}\sin\phi_{2n-1} + a_{2n}\sin\phi_{2n}\sin\theta + \ldots \quad (9)$$

Then, if the equations (8) and (9) are added together, $$S = Hs + Hs' = 2a_2\sin\phi_2\sin\theta + 2a_4\sin\theta + \ldots + 2a_{2n}\sin\phi_{2n}\sin\theta + \quad (10)$$

Consequently, odd-number order terms (constant terms) can be canceled from the equation (10) and in the equation (10), $a_{2n}$ and $\sin\phi_{2n}$ can be constants having certain values.

Then, if $2a_{2n}\cdot\sin\phi_{2n}=b_{2n}$, the equation (10) can be rearranged as:

$$S = b_2\sin\theta + b_4\sin\theta + \ldots + b_{2n}\sin\theta + \ldots \quad (11)$$

$$S = \sum_{n=1}^{\infty} b_{2n}\sin\theta \quad (12)$$

As in the equation (12), the term only including the scale signal, i.e., the true equilibrium modulated signal of each head can be fetched therefrom.

FIGS. 10(A) through 10(F) show output waveforms of the equilibrium modulated signal hs, sampling pulses $f_p$ and sampled waveforms of each derived pulse Hs and Hs', and added waveform S of the pulses Hs and Hs'.

As shown in FIG. 10(A), the equilibrium modulated signal hs output from the detecting head 9 and amplified by means of the amplifier 5 is a distorted wave having positive and negative peak values of the signal with respect to the scale movement being denoted by a solid line and dot line, respectively.

As denoted by the solid line of FIG. 10(A), the peak values of Hs(x) and H(x)' have two kinds, i.e., the positive and negative peaks.

If the sampling period is T/2, the two levels of Hs(x) and Hs(x)' appear so that the output levels provide non-linear forms. Therefore, since the sampling period is selected to be T so that the linear Hs(x) appears. However, since the values of Hs(x) and H(s)' are different and output sinusoidal waveform Hs provides a deviated DC component.

Then, if the sampling pulse $f_p'$ is provided with its phase deviated by the period of ½ T is prepared so that the sampled signal Hs' is given by the sampling thereof using the sampling pulse $f'_p$. This is because since the signal Hs' is output in the inverted form of the Hs signal, the addition of both Hs and Hs' is carried out so that the DC offset is canceled to provide the output signal S. The output signal S serves to recognize the relative displacement of the scale 10 with respect to the detecting head 9.

The DC offset due to the higher harmonics is, thereby, canceled from the output signal S. The output signal and a load applied to the subsequent circuit can be relieved.

In addition, since the addition is carried out with the sampling time T and with the 180-degree shifted sampling time T, the sampling time deceptively gives T/2 so that a maximum response speed is improved.

In the embodiment described above, although the detecting head 9 and the single channel circuit are formed, a plurality of channels of the detecting head 9, first sample-and-hold circuit 7, phase shifter 3, second sample-and-hold circuit 8, and adder 6 may be added as required.

It is of course that the optical head and optical heads, magnetic encoder and heads made of magnetoresistance elements may be used in place of the magnetic scale and magnetic heads.

As described herein above, the relative displacement detecting apparatus according to the present invention, no band pass filter is used so that the equilibrium signal(s) derived from detecting heads are sampled by means of, e.g., sampling circuits to provide a DC voltage signal indicative of the relative displacement of the scale with the heads, their maximum values are held to derive the DC continuous voltage signal indicative thereof, the circuit structure becomes less sized and less cost, and the DC offset is canceled by means of 180-degree phase shifter and adder to add equilibrium modulated signal and 180-phase shifted same signal.

The other various effects can be achieved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus comprising:
   a) a scale;
   b) first means for generating and outputting an excitation signal of an alternating current having a reference period of time;
   c) at least one head in a first channel circuit which is so constructed to generate an equilibrium modulated signal from the head in response to a displacement of said scale relative to said head, said equilibrium modulated signal indicating the relative displacement of said scale relative to the head, utilizing the excitation signal derived from said first means; and
   d) second means for receiving and converting said equilibrium modulated signal derived from said head to provide a continuous DC voltage signal, a level of said DC voltage signal indicating the displacement of said scale relative to said head,
   wherein said second means comprises a sample-and-hold circuit which samples and holds said equilibrium modulated signal derived from said head using a sampling pulse which is synchronized with said reference period of time of said excitation signal and outputs the DC voltage signal after the sampling,
   said first means includes a sinusoidal wave generator which generates a sinusoidal wave having the reference period of time and an excitation signal generator which generates said excitation signal in response to the sinusoidal wave from said sinusoidal wave generator and outputs the sinusoidal wave to said head as: $\epsilon = i \cdot \sin \pi f t$, wherein f denotes a reference frequency of the sinusoidal wave generated by said generator and t denotes the time,
   said second means includes a phase shifter which, in response to said sinusoidal wave of said sinusoidal wave generator, generates and outputs the sampling pulse to said sample-and-hold circuit, the sampling pulse having a period synchronized with the period of said equilibrium modulated signal and corresponding to each peak value of said equilibrium modulated signal and wherein said equilibrium modulated signal hs is in the form of:

$$hs = b_1 + b_2 \sin\theta + b_3 + b_4 \sin\theta + \ldots + b_{2n-1} +$$

$$b_{2n}\sin\theta + \ldots = \sum_{n=1}^{\infty} b_{2n-1} + \sum_{n=1}^{\infty} b_{2n}\sin\theta$$

wherein $\theta$ denotes $2\pi x/\lambda$, x denotes the relative displacement between said head and scale, $\lambda$ denotes a scale wavelength of said scale, $b_{2n-1}$ and $b_{2n}$ denote constants, and n denotes a natural number.

2. An apparatus as set forth in claim 1, which further includes another channel circuit which includes another detection head located adjacent to said scale and so as to provide an electrical phase difference from said head of $\pi/2$ and another sample-and-hold circuit connected to said phase shifter, the equilibrium modulated signal hc in the said another other channel circuit is expressed as:

$$hc = \sum_{n=1}^{\infty} c_{2n-1} + \sum_{n=1}^{\infty} c_{2n}\cos\theta$$

wherein $c_{2n-1}$ and $c_{2n}$ denote constants and n denotes a natural number.

3. An apparatus as set forth in claim 2, wherein output signals Hs(x) and Hc(x) of said respective sample-and-hold circuits are expressed as:

$$Hs(x) = D_1 + D_2 \sin(2\pi x/\lambda)$$

$Hc(x) = E_1 + E_2 \cos(2\pi x/\lambda)$, wherein $D_1, D_2, E_1, E_2$ denote constants.

4. An apparatus as set forth in claim 3, wherein each of said heads comprises magnetic head reading a position of a magnetic recording type scale constituting said scale.

5. An apparatus as set forth in claim 3, wherein each of said heads comprises a magnetoresistance element reading a position of a magnetic recording type scale constituting said scale.

6. An apparatus as set forth in claim 3, wherein each of said heads comprises a light emitting device and a light receiving device with respect to an optical scale constituting said scale so that the light receiving device receives the light emitted from said light emitting device through said optical scale.

7. An apparatus as set forth in claim 1, which further includes other two channel circuits which includes other two heads and two sample-and-hold circuits, said head being located adjacent to said scale so as to provide other equilibrium modulated signals each having a phase difference of $\pi/3$ from that of one of the other heads.

8. An apparatus as set forth in claim 1, wherein said second means includes: a first sample-and-hold circuit which samples and holds the equilibrium modulated signal from said head using a first sampling pulse which is synchronized with the reference period of time of said first means; a phase shifter which shifts said first sampling pulse by 180 degrees; a second sample-and-hold circuit which samples and holds the equilibrium modulated signal from said head using a second sampling pulse which is derived from said 180-degree phase shifted first sampling pulse by said phase shifter; and an adder which adds both sampled signals of said first and second sample-and-hold circuits.

* * * * *